No. 607,948. Patented July 26, 1898.
I. OSGOOD.
CARRIAGE COUPLING.
(Application filed Dec. 13, 1897.)
(No Model.) 2 Sheets—Sheet 1.
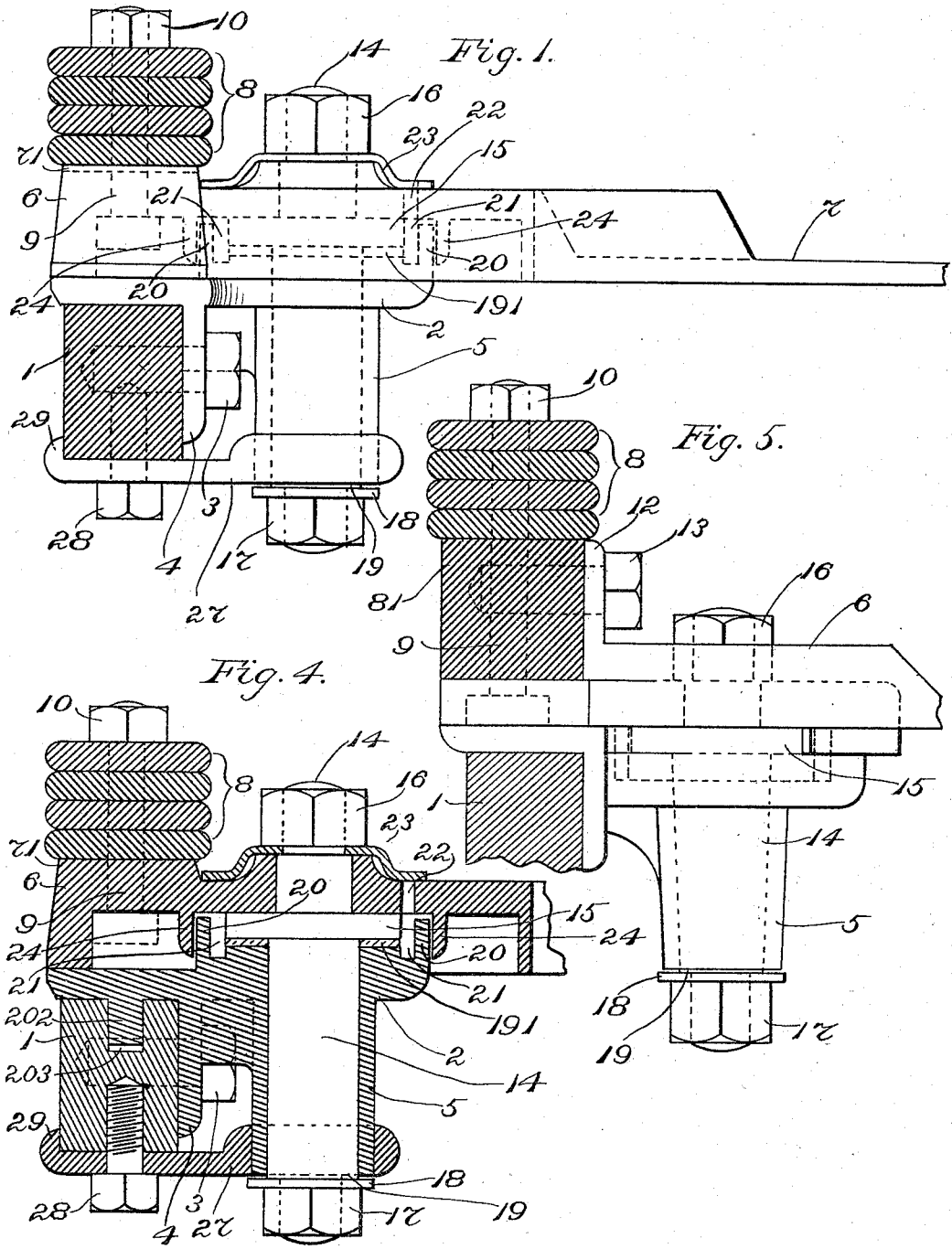
Witnesses:
Oscar F. Hill
Robert Wallace
Inventor:
Isaac Osgood
by Macleod Calver Randall
Attorneys.

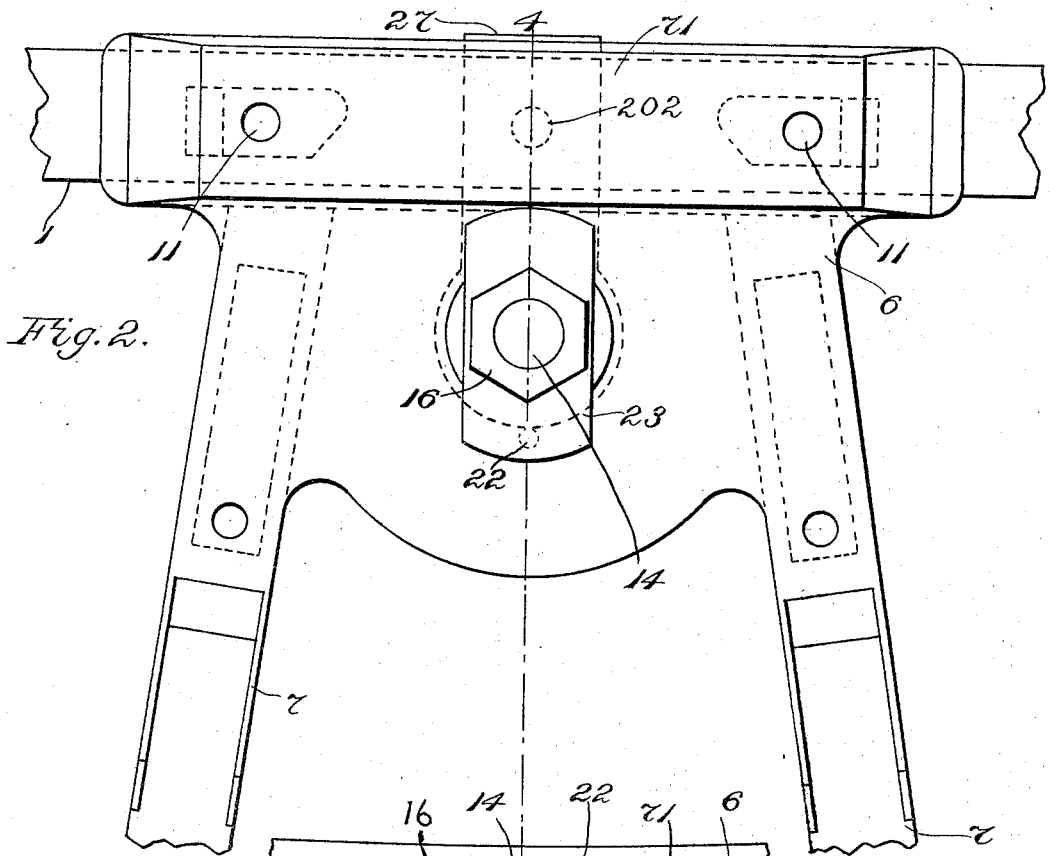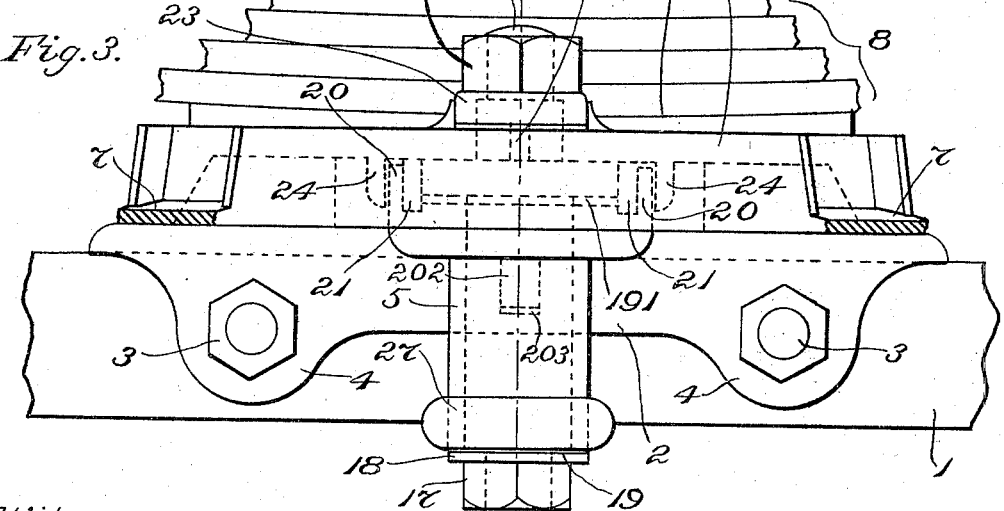

UNITED STATES PATENT OFFICE.

ISAAC OSGOOD, OF AMESBURY, MASSACHUSETTS.

CARRIAGE-COUPLING.

SPECIFICATION forming part of Letters Patent No. 607,948, dated July 26, 1898.

Application filed December 13, 1897. Serial No. 661,615. (No model.)

*To all whom it may concern:*

Be it known that I, ISAAC OSGOOD, a citizen of the United States, residing at Amesbury, in the county of Essex and State of Massachusetts, have invented certain new and useful Improvements in Carriage-Couplings, of which the following is a specification, reference being had therein to the accompanying drawings.

Figure 1 of the said drawings is a view representing in side elevation a carriage-coupling embodying my invention, the axle and spring in connection with which the said coupling is employed being shown in vertical transverse section. Fig. 2 is a view in plan of the parts which are shown in Fig. 1, the spring being omitted, however. Fig. 3 is a view looking from the lower side in Fig. 2. Fig. 4 is a view in section on the plane which is indicated by the dotted line 4 4 in Figs. 2 and 3. Fig. 5 represents in edge view or side elevation the form of upper coupling member which I prefer for use in connection with a head-block interposed between the spring and the said upper member, the said head-block and spring being shown in vertical section.

The invention consists in a carriage-coupling of novel character and construction which I now will proceed to describe fully with reference to the accompanying drawings aforesaid, in which latter I have illustrated the best embodiment of the invention which I have yet contrived, after which the distinguishing characteristics of the invention will be particularly pointed out and distinctly defined in the claims at the close of this specification.

Having reference to the drawings, 1 designates the front axle of a vehicle, my improved coupling being represented as applied to the said axle.

2 designates the lower member of the coupling, the same being carried by or connected with the axle 1. The precise manner in which the said member 2 is applied to or connected with the said axle 1 is not material so far as my invention is concerned. Thus the said member may be made integral with the axle or it may be formed as a separate piece which is attached in suitable manner to the axle. I have shown this latter construction in the drawings, in which latter the member 2 is mounted on the axle and secured thereto by means of bolts 3 3, passing through a depending plate, as 4, or corresponding lugs fitting against the rear face (the right-hand face in the drawings) of the axle 1. At the rear of the axle 1—that is to say, at the right-hand side thereof in Figs. 1, 2, and 4—the member 2 of the coupling is formed or provided with a vertical pipe-box or bearing, which is designated 5 in the drawings. The upper member of the coupling is designated 6 herein, it having rearwardly-extending—that is to say, extending toward the right in the drawings— branches or tangs 7 7 to receive the forward extremities of the perches, the said branches or tangs being shown in the present instance as laterally divergent toward their free extremities. The form and character of these tangs or branches and the manner of connecting the perches therewith may be varied as desired. In other words, the provisions for connecting or attaching the forward extremities of the perches to the upper member of the coupling are not material to my present invention.

In Figs. 1 to 4 the forward part of the upper coupling member 6 is shown as provided with the customary spring-seat 71, the spring 8 being represented in position thereon in Fig. 1 and being shown in the said figure as connected to the said seat by means of a bolt 9 (two bolts being employed in practice) and a nut or nuts 10, applied to each bolt 9, the stems of the two bolts which are employed in practice passing through vertical holes which are provided in the upper member 6. In some cases it is found desirable in practice to employ a head-block, usually of wood, interposed between the upper coupling member and the spring. I have shown such a head-block at 81 in Fig. 5 with the spring mounted thereon, and in the said figure the head-block and spring are shown secured together and to the coupling member 6 by means of a bolt 9 (two such bolts being employed in practice) and a nut or nuts 10, applied to each such bolt.

For the purpose of giving lateral support to the head-block 81, Fig. 5, and of securing a stiffer and stronger structure I form or provide the upper coupling member 6 with one or more vertically-extending plates, lugs, ears, or the like projections, as at 12, Fig. 5. The rear side of the head-block 81 (the right-hand side thereof in the drawings) rests against the face or faces of the said plate, lugs, ears, or the like, and the head-block is made fast thereto by means of bolts 13. The rearwardly-projecting portion of the coupling member 6 is provided with a depending stud or bolt, which herein is designated 14, and the lower portion of which is fitted to the interior of the pipe-box or bearing 5. The said stud or bolt 14 takes the entire strain horizontally in the use of my carriage-coupling. For the purpose of bracing the same—that is to say, affording a stay against lateral bending in consequence of the horizontal strain— it is formed with a collar, as 15, on the upper portion thereof, which is somewhat greater in diameter than the body portion of the bolt— namely, the portion thereof which bears against the under surface of the upper member of the coupling. The said collar is received within the pipe-box or bearing 5, the portion of the said bolt which is next above the said collar fitting a hole which is made vertically through the rearwardly-projecting part of the upper coupling member 6. The bolt 14 is connected fixedly with the upper coupling member. Herein the portion of the bolt which projects above the said coupling member 6 is shown screw-threaded and as receiving the nut 16. The tightening up of the said nut secures the bolt rigidly in place on the coupling member 6. The lower extremity of the bolt 14 projects below the lower end of the pipe-box or bearing 5. It is threaded and receives the nut 17, a washer, as at 18, being usually mounted on the bolt between the nut 17 and the shoulder 19, that exists where the change in diameter of the bolt takes place—namely, at the inner termination of the threaded portion. The said shoulder 19 projects slightly below the lower end of the pipe-box or bearing 5 in order that when the nut 17 is tightened up to clamp the washer between itself and said shoulder a space shall be left between the upper surface of the washer and the lower end of the pipe-box, affording opportunity for slight vertical play of the bolt within the pipe-box. This space existing between the washer and the pipe-box provides against loosening of the nut in consequence of the turning of the bolt within and relatively to the pipe-box or bearing 5.

The under surface of the collar 15 on the bolt 14 may bear upon the upper end of the pipe-box or bearing 5, or, as shown clearly in the drawings, a washer of any suitable or approved material may be interposed between the proximate surfaces, as at 191, to take the wear. Around the upper end of the pipe-box or bearing 5 and the collar 15 on the bolt 14 an upwardly-extending wall, as at 20, is provided on the coupling member 2, this wall being out of contact with the periphery of the said collar and separated by horizontal space of greater or less width from the said periphery. The space in question, the same being designated 21 in the drawings, constitutes an oil holding and receiving receptacle, and, if desired, the bottom of the said space may be located somewhat below the surface at the upper end of the pipe-box or bearing 5 in order to provide for the deposit of dirt and sediment contained in the lubricant or finding its way into the space 21. An oil-hole 22, made downwardly through the rearwardly-extending portion of the upper coupling member 6, permits oil or other lubricant to be introduced or fed at will into the space at 21.

For the purpose of excluding dust and dirt I provide the oil-hole 22 with a shield or cover, as at 23. This shield or cover may be of any approved character; but preferably it consists of a strip or plate of spring material which is fitted onto the upper extremity of the bolt 14, the nut 16 making contact with the middle or body portion of the said strip or plate and compressing one or both of the extremities of the latter into contact with the upper surface of the coupling member 6. The contacting extremity or extremities will be downturned, as in Fig. 1, and the terminal portion of each of the said downturned extremities lies flatwise upon the said surface of the coupling member 6, so that when one of them is in position over the oil-hole 22 it closes the latter. A quarter-turn or the like of the nut 16 serves to relieve the cover or shield 23 from compression sufficiently to enable it to be turned by hand to expose the oil-hole.

24 designates a downwardly-projecting flange which is formed on the upper coupling member 6 and extends outside the upwardly-extending wall 21, the latter being constituted by or forming part of an upwardly-extending flange on the lower coupling member 2. The flanges 24 and 21 overlap, but are not intended to contact with each other, the flange 24 being intended to serve simply as a dust-guard.

For the purpose of affording support to assist the pipe-box or bearing 5 to withstand laterally-exerted strains I provide a stay or brace, as at 27, for the downwardly-extending portion of the said pipe-box or bearing. This stay or brace is shaped at its rear end (at the right in the drawings) to encircle the lower end of the said pipe-box or bearing, while its opposite end portion fits against the under side of axle 1 and is held thereto by a bolt, as 28, the extremity of such portion having a lip or shoulder 29, projecting upwardly and engaging with the front side (the left-hand side in the drawings) of axle 1. The engagement of this shoulder with the axle prevents rearward movement of the stay or brace 27, and thereby restrains the lower end of the pipe-box or bearing from yielding in that direction.

In some cases I prefer to form or provide the lower coupling member 2 with a projection or projections, as 202, extending downward from the front portion of the horizontal plate or flange of such coupling member, as shown clearly in Fig. 4, and entering a recess, as 203, formed for its reception in the upper portion of axle 1. The surface of the said projection or projections and recess fit or bear against each other, so that in use the projection or projections shall constitute a means of engaging the lower coupling member 2 with the axle 1, thereby relieving or tending to relieve from excessive strain during use the bolts or screws 3 3, which secure the lower coupling member to the axle and preventing disconnection of the said lower coupling member from the axle in case of breakage of the said bolts. Thus should the said bolts break the engagement of the downwardly-extending portion of the lower member of the coupling with the axle will prevent the axle from drawing out from under the said lower coupling member. As will be apparent, the location and form of the projection 202 and the number of projections employed may be varied as desired.

I claim as my invention—

1. The combination with the coupling member having the pipe-box or bearing, of the king-bolt fitting within said pipe-box or bearing, the other coupling member having the said king-bolt applied thereto, and means of rigidly affixing the king-bolt to the latter coupling member, the king-bolt receiving the entire horizontal strain, substantially as described.

2. The combination with the coupling member having the pipe-box or bearing, of the king-bolt fitting within said pipe-box or bearing and having the projecting collar, the other coupling member having the said king-bolt applied thereto, and means of rigidly affixing the king-bolt to the latter coupling member, substantially as described.

3. The combination with the coupling member having the pipe-box or bearing and the oil-cup at the upper end of such pipe-box or bearing, of the king-bolt fitting within said pipe-box or bearing and having the projecting collar located within said oil-cup, the other coupling member having the king-bolt applied thereto, and means of rigidly affixing the king-bolt to the latter coupling member, substantially as described.

4. The combination with the coupling member having the pipe-box or bearing, and the stay or brace applied to one end of said pipe-box or bearing and whereby to afford support to the latter against laterally-exerted strain, of the king-bolt fitting within said pipe-box or bearing and having the projecting collar, the other coupling member having the said king-bolt applied thereto, and means of rigidly affixing the king-bolt to the latter coupling member, substantially as described.

5. The combination with the axle, of the lower coupling member having the pipe-box or bearing and seated upon the upper side of the axle and secured thereto, the said member having a downwardly-projecting portion constructed to engage with the axle and receive the strain and to prevent the axle from drawing out from under the lower coupling member in case of breakage of the securing-bolts, the king-bolt fitting within said pipe-box or bearing and having the projecting collar, the other coupling member having the said king-bolt applied thereto, and means of rigidly affixing the king-bolt to the latter coupling member, substantially as described.

6. The combination with the axle, and head-block, of the lower coupling member applied to the axle and having the pipe-box or bearing, the upper coupling member having a seat for the head-block and also the upwardly-extending plate or lugs bolted to said head-block, the king-bolt applied to said upper coupling member, fitting within said pipe-box or bearing, and having the projecting collar, and means of rigidly affixing the king-bolt to the upper coupling member, substantially as described.

In testimony whereof I affix my signature in presence of two witnesses.

ISAAC OSGOOD.

Witnesses:
CHAS. F. RANDALL,
EDITH J. ANDERSON.